United States Patent [19]

Usui et al.

[11] Patent Number: 4,968,523

[45] Date of Patent: * Nov. 6, 1990

[54] PROCESS FOR PREPARATION OF SHELLFISH EXTRACT CONCENTRATE, AND SHELLFISH EXTRACT CONCENTRATE

[75] Inventors: Koichi Usui, Tokyo; Masahide Ogawa, Shibata; Koyoshi Takai, Kawasaki; Teiji Sato; Masanori Tanaka, both of Shibata; Izumi Serizawa, Tokyo, all of Japan

[73] Assignee: Mizusawa Industrial Chemicals, Ltd., Tokyo, Japan

[*] Notice: The portion of the term of this patent subsequent to Sep. 13, 2005 has been disclaimed.

[21] Appl. No.: 222,924

[22] Filed: Jul. 22, 1988

[30] Foreign Application Priority Data

Jul. 22, 1987 [JP] Japan ................................ 62-181249

[51] Int. Cl.$^5$ ...................... A22C 29/02; A22L 1/221
[52] U.S. Cl. ................................ 426/655; 426/330; 426/422; 426/423; 426/650
[58] Field of Search ............... 426/655, 422, 423, 330, 426/650

[56] References Cited

U.S. PATENT DOCUMENTS

| 3,734,734 | 5/1973 | Halpern et al. | 426/330 |
| 3,940,498 | 2/1976 | Butterworth et al. | 426/423 |
| 4,684,530 | 8/1987 | Welsh et al. | 426/330.4 |
| 4,770,894 | 9/1988 | Usui et al. | 426/655 |
| 4,801,453 | 1/1989 | Kosuge et al. | 424/95 |

FOREIGN PATENT DOCUMENTS

| 60-180566 | 9/1985 | Japan | 426/655 |
| 61-81763 | 4/1986 | Japan . | |

Primary Examiner—Donald E. Czaja
Assistant Examiner—Evan Federman
Attorney, Agent, or Firm—Sherman and Shalloway

[57] ABSTRACT

A shellfish extract concentrate is prepared by subjecting an extract of a shellfish (exclusive of oyster) having a solid concentration not higher than 30% by weight to an adsorption purification treatment with an adsorbent composed mainly of a water-insoluble inorganic magnesium compound, which has a specific surface area of at least 50 m$^2$/g, and concentrating the refined liquid in a substantially non-oxidizing atmosphere. In this shellfish extract concentrate, black and blackish brown coloring components are not contained, and flavor components and nutrients are not substantially lost. Accordingly, this shellfish extract concentrate is excellent in taste, flavor and hue.

14 Claims, 4 Drawing Sheets

PROCESS FOR PREPARATION OF SHELLFISH EXTRACT CONCENTRATE, AND SHELLFISH EXTRACT CONCENTRATE

BACKGROUND OF THE INVENTION (1) Field of the Invention

The present invention relates to a process for the preparation of a concentrate of an extract of a shellfish (exclusive of oyster). More particularly, the present Invention relates to a process for the preparation of a shellfish extract concentrate which is excellent in the hue and taste and is valuable as a natural seasoning, a base or additive of a seasoning or as a food. Furthermore, the present invention relates to a shellfish extract concentrate obtained according to this process.

(2) Description of the Prior Art

A shellfish extract contains large amounts of flavor components such as glutamic acid and flavor-enhancing components such as glycogen, and a shellfish extract obtained by concentrating a soup formed as a by-product in the production of canned shellfish is used as a natural seasoning. Moreover, since the shellfish extract contains ingredients effective for recovering and maintaining functions of the human body, a concentrated and dried product of the shellfish extract is marketed as a healthy food.

However, the shellfish extract concentrate contains relatively large amounts of black and blackish brown components and has an appearance resembling that of soy sauce or Worcestershire sauce and therefore, is not suitable for seasoning foods in which coloration is disliked. Furthermore, the concentrate containing such black or blackish brown components has a taste or smell which is not desirable for a seasoning, giving a bitterness, astringency or scorching smell, and the entire taste of the concentrate is heavy and greasy Accordingly, the conventional shellfish extract concentrate is used for cooked foods such as frizzled foods and broiled foods but not used for light-taste foods such as soup, clear soup, boiled foods and salads.

Although various methods for separating such black and blackish brown components from the shellfish extract concentrate have been examined and tried, since these coloring components are stably dispersed in the liquid, separation by adsorption or the like is very difficult.

In separating and removing the coloring components, it is important that the content of flavor components or nutrients contained in the shellfish extract should not be reduced A refining agent, such as an adsorbent, capable of satisfying this requirement has not been developed.

SUMMARY OF THE INVENTION

We previously filed a patent application for an oyster extract concentrate in which the above-mentioned defects are eliminated and a process for the preparation of this oyster extract concentrate (Japanese Patent Application No. 6371/86). We have now found that this technique can be similarly applied to extracts of other shellfishes, and we have completed the present invention based on this finding.

In accordance with the present invention, there is provided a process for the preparation of a shellfish extract concentrate, which comprises subjecting an extract of a shellfish (exclusive of oyster) having a solid concentration not higher than 30% by weight to an adsorption purification treatment with an adsorbent composed mainly of a water-insoluble inorganic magnesium compound, which has a specific surface area of at least 50 $m^2/g$, and concentrating the refined liquid in a substantially non-oxidizing atmosphere so that the solid concentration is at least 5% by weight.

In accordance with another aspect of the present invention, there is provided a decolorized extract concentrate of a shellfish (exclusive of oyster), comprising as indispensable components amino acids, proteins, saccharides and minerals and having a solid content of at least 5% by weight, wherein the integrated absorbance S represented by the following formula is not larger than 200:

$$S = \int_{400}^{800} \epsilon(x)dx$$

wherein (x) represents the absorbance at a wavelength of x nm, determined by using a cell having a thickness of 10 mm with respect to an aqueous solution having a solid concentration of 5% by weight.

While we were making research leading to the present invention, we found the following interesting fact.

When an extract of a shellfish, for example, a hard-shelled mussel, is concentrated, at an initial stage where the solid concentration is low, black or blackish components are hardly present or, if present, the amounts are very small, and in an oxidizing atmosphere, as the solid concentration exceeds 10% by weight with advance of the concentration, the contents of the black or blackish brown components are drastically increased, or in a non-oxidizing atmosphere, if the solid concentration exceeds 30% by weight, coloration becomes conspicuous As pointed out hereinbefore, if the contents of the coloring components are thus increased, removal of these coloring components by conventional refining means such as an adsorption treatment is very difficult It is construed that the reason is that several components contained in the shellfish extract are mutually reacted or condensed with one another during the concentration to form coloring components having a relatively high molecular weight Namely, it is considered that formation of such black and blackish brown components is due to a browning or blacking reaction called "Maillard Reaction" generally caused between amino group-containing compounds such as amino acids, amines and proteins and saccharides or carbonyl compounds in the processing or storage of foods.

In heat processing of foods, the reactivity of reduced sugar is increased, and the Maillard Reaction caused by reduced sugar results in reduction of nutritive values of foods and deterioration of taste components.

The present invention is based on the finding that if a shellfish extract is treated with an adsorbent composed mainly of an inorganic magnesium compound having a specific surface area of at least 50 $m^2/g$, for example, lamellar magnesium phylosilicate, at a stage before formation of large quantities of the above-mentioned coloring components, precursors of the black and blackish brown coloring components can be effectively removed without substantial reductions of the contents of flavor components or nutrients.

According to the present invention, since precursors of the coloring substances are removed, if the refined liquid obtained by the above-mentioned treatment is concentrated to a high solid concentration, coloring substances are not formed and a concentrate excellent in the hue, taste and flavor can be obtained.

The reason why the above-mentioned inorganic magnesium compound specifically adsorbs and removes the precursors of the coloring substances in the present invention has not been completely elucidated, but it is construed that this effect is attained by not only physical adsorption but also chemical adsorption (including ion adsorption) and control of the above-mentioned browning reaction The fact that these three factors participate in attainment of the above-mentioned effect coincides with the fact that the water-insoluble inorganic magnesium compound exhibits only a very low adsorbing property to the coloring components formed during the concentration.

The shellfish extract concentrate of the present invention does not contain black or blackish brown coloring components but has a light yellow or amber appearance, and it can be used for seasoning various foods. Furthermore, since bitterness, astringency, burnt smell and other bad tastes and smells are removed and gentle, mellow and delicious flavor and taste inherent to a shellfish are emphasized, the shellfish extract concentrate of the present invention can be used as a seasoning, a seasoning base or a seasoning assistant for all of cooked and processed foods including soups, soy-boiled vegetables and fishes, roast fishes and meats, salads, delicacies, cakes and drinks. Moreover, since the shellfish extract concentrate of the present invention has a good taste and is excellent in the drinkability, it can be used as a healthy food or for nutrient replenishment.

In the process of the present invention, it is sufficient if a shellfish extract is contacted with the above-mentioned adsorbent at the intermediate stage of the concentration process, and no particular refining treatment is necessary, the operation is simple and the treatment cost is relatively small.

DETAILED DESCRIPTION OF THE PREFERRED EMBODIMENTS

Figure 1:
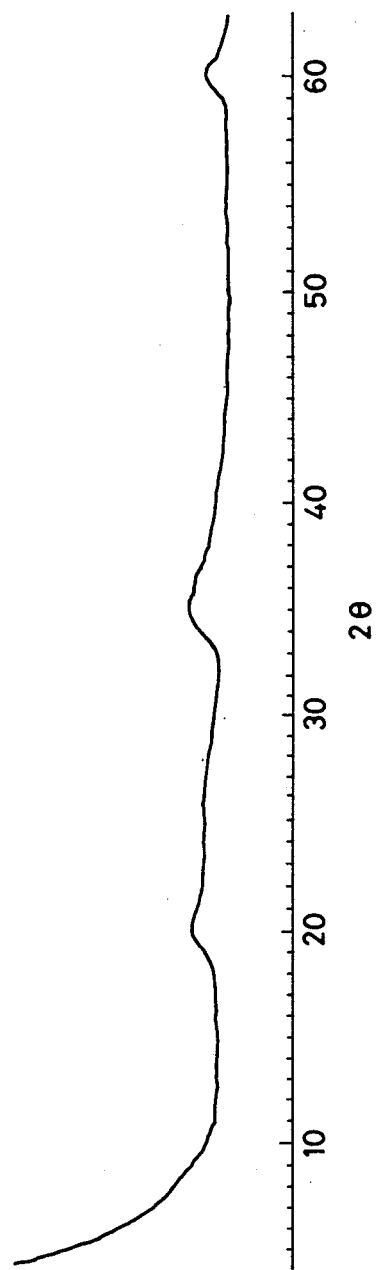
FIG. 1 is a diagram illustrating an X-ray diffraction spectrum, obtained by using Cu-K rays, of lamellar magnesium phylosilcate used in the examples of the present invention.

All of shellfishes exclusive of oyster can be treated according to the present invention. For example, there can be mentioned *Liolophura japonica*, snails such as periwinkle and horn shell, *Aplysia kurodai* such as sea hare, *Lymnaeidae* such as lymnaied, *Thecosomata* such as *Limacina*, *Anadara* such as ark shell and *Arca*, *Mytilidae* such as blue mussel, hard-shelled mussel and scallop, clams such as corbicula and short-necked clam, and *Myaarenaria* such as soft-shelled clam. Shellfishes belonging to *Mytilidae,* such as blue mussel, hard-shelled mussel and scallop, are preferably used.

A shellfish soup or a partial concentrate thereof is advantageously used as the starting shellfish extract. The starting shellfish extract has a solid concentration of 2 to 30% by weight, preferably 3 to 15% by weight. If the solid concentration is too high and exceeds the above-mentioned range, the contents of black or blackish brown coloring components in the starting extract are increased and no good results can be obtained. If the solid concentration is too low and below the above-mentioned range, a large quantity of the liquid should be treated and the process becomes economically disadvantageous. A shellfish extract obtained by treating ground meat of shellfish as mentioned above under actions of heat and water can be used as the starting shellfish extract, as well as the above-mentioned starting extract. Moreover, a desalted extract obtained by subjecting the above-mentioned starting extract to a desalting operation using an ion exchange membrance can be used.

Contents of ingredients in a dry hard-shelled mussel extract as an example of the starting shellfish extract are shown in Table 1.

TABLE 1

| total nitrogen | 1.58% |
|---|---|
| iron | 0.45 mg/100 g |
| calcium | 81.5 mg/100 g |
| NaCl (as Na) | 3.64% |
| magnesium | 205 mg/100 g |
| copper | 4.49 ppm |
| zinc | 4.42 ppm |
| manganese | 0.60 ppm |
| selenium | 0.32 ppm |
| taurine | 3.04% |

In the present invention, an adsorbent composed mainly of a water-insoluble inorganic magnesium compound, which has a specific surface area of at least 50 $m^{2/}g$, especially 100 to 800 $m^{2/}g$, is used for the adsorption purification treatment of the above-mentioned starting oyster extract. A magnesium compound having a specific surface area smaller than 50 $m^{2/}g$ is inferior to the magnesium compound used in the present invention in the property of adsorbing precursors of coloring components. It is important that this inorganic magnesium compound should be substantially insoluble in water. A water-soluble compound is not preferred from the viewpoint of the flavor of the concentrate Silicates, carbonates, partial acid adducts and partial hydroxides of magnesium, which are lowly crystalline and have a large specific surface area, are preferred as the water-insoluble inorganic magnesium compound having a high adsorbing capacity, that are used in the present invention.

Magnesium silicate obtained by the hydrothermal treatment of a silicic acid component and an oxide and-/or hydroxide of magnesium, which has a composition represented by the following formula:

$$MgO \cdot mSiO_2 \cdot nH_2O$$

wherein m is a number of from 0.5 to 2 and n is a number not larger than 2, and a specific surface area of at least 100 m²/g, is preferably used, and magnesium silicate in which m in the above-mentioned composition formula is 4/3 is especially preferred.

The most preferred magnesium silicate (m=4/3) is a water-insoluble mineral composed of lamellar magnesium phyllosilicate, which is represented by the following structural formula:

$(Mg_3)(Si_2O_5)_2(OH)_2 \cdot xH_2O (x \leq 5)$ and has X-ray diffraction peaks at spacings of 4.5–4.6 Å, 2.5–2.6 Å and 1.5–1.6 Å and a specific surface area of at least 300 m²/g. This lamellar phyllosilicate mineral can be synthesized by using as the starting silicic acid component active silicic acid or active aluminosilicic acid obtained by the acid treatment of (1) amorphous silica such as synthetic silicic acid, natural diatomaceous earth or ferrosilicon dust, (2) crystalline silica such as calcined diatomaceous earth or siliceous stone or (3) a clay mineral, or (4) a compound capable of forming silica under reaction conditions and as the starting magnesium component an oxide or hydroxide of magnesium or a compound capable of forming an oxide or hydroxide of magnesium, mixing both the components in an aqueous medium and subjecting the resulting slurry to a hydrothermal treatment under atmospheric or elevated pressure. The reaction is carried out at a temperature of 80° to 200° C., and at this temperature, the pressure of the reaction system is maintained at 0.5 to 16 kg/cm². The reaction time is changed according to the temperature and pressure, but a reaction time of 0.5 to 10 hours is preferred. The product is washed with water according to need and is subjected to post treatments such as drying, pulverization and classification, whereby a water-insoluble white powdery adsorbent is obtained.

As is inferable from the structural formula of $(Mg_3)(Si_2O_5)_2(OH)_2 \cdot xH_2O (x \leq 5)$, the so-obtained synthetic magnesium phylosilicate has a structure resembling the structure of talc which is a natural clay mineral. Namely, the magnesium phyllosilicate has mainly a three layer structure comprising an octahedral layer (brucite layer) of $MgO_6$ sandwiched between two tetrahedral layers (phylosilicic acid layers) of $SiO_4$, and has X-ray diffraction patterns characteristic of this lamellar structure. FIG. 1 shows an X-ray diffraction pattern of the synthetic lamellar magnesium phylosilicate used most preferably in the present invention. It is obvious that the magnesium phylosilicate has diffraction patterns at spacings of 4.5–4.6 Å (corresponding to planes (020) and (110)), 2.5–2.6 Å (corresponding to plane (200)) and 1.5–1.6 Å (corresponding to plane (060)). These X-ray diffraction patterns are common to natural trioctahedral lamellar clay minerals.

The synthetic lamellar magnesium silicate used in the present invention has a very large specific surface area and a very high adsorbing power, not obtained in natural phylosilicates such as talc. This is due to the fact that the synthetic magnesium phyllosilicate is lowly crystalline, as is apparent from broad shapes of the X-ray diffraction peaks, and crystallites are fine and lamination of the layers is irregular. Therefore, the lamellar structure of the magnesium phylosilicate is considered to allow other substances to intrude between the adjacent layers.

The adsorbent used in the present invention, which is composed mainly of the above-mentioned inorganic magnesium compound, may be used in the powdery state, but in order to facilitate solid-liquid separation after the adsorption treatment, it is preferred that the adsorbent powder be molded with water, if necessary, together with a water-insoluble sticky mineral such as acid clay, kaolin or bentonite, and the molded body be caked by drying or calcination and the resulting granular or other molded body be used for the adsorption treatment. It is preferred that the inorganic magnesium compound be added to the shellfish extract in an amount of 0.5 to 20% by weight, especially 1 to 15% by weight based on the shellfish extract. If the amount of the inorganic magnesium compound is too small and below the above-mentioned range, removal of precursors of coloring substances is insufficient, and if the amount of the inorganic magnesium compound is too large and exceeds the above-mentioned range, substantial amounts of flavor components or nutrients are adsorbed and removed and the intended object of the present invention is not attained.

In the present invention, the inorganic magnesium compound alone may be used as the adsorbent, or it may be used in combination with other adsorbents such as active clay, acid clay, silica, alumina, silica-alumina, zeolite and active carbon. The combination of the inorganic magnesium compound with active carbon is especially preferred because precursors of coloring components can be most effectively adsorbed and removed without substantial reduction of the contents of flavor components.

In the case where the inorganic magnesium compound is singly used, a considerably large amount of the inorganic magnesium compound should be used for complete removal of precursors of coloring components, and a considerable adsorption of taste components is inevitably caused. Although active carbon is considerably effective for removal of precursors of coloring components, active carbon is fatally defective in that active carbon simultaneously adsorbs flavor components and drastically reduces the contents of flavor components. If both are used in combination, precursors of coloring components can be effectively removed without substantial reduction of the contents of flavor components. In this case, it is preferred that the inorganic magnesium compound be used in an amount of 0.5 to 20% by weight, especially 1 to 15% by weight, based on the shellfish extract and active carbon be used in an amount of 0.05 to 5% by weight, especially 0.1 to 3% by weight, based on the shellfish extract. It is especially preferred that the weight ratio of the inorganic magnesium compound to active carbon be from 2/1 to 10/1. It is preferred that the starting shellfish extract be contracted simultaneously with the inorganic magnesium compound and active carbon. However, there may be adopted a method in which the shellfish extract is first contacted with active carbon and then with the inorganic magnesium compound, or the reverse contact order may be adopted.

The conditions for the contact of the starting shellfish extract with the adsorbent are not particularly critical, so far as precursors of coloring components are sufficiently adsorbed and removed. However, it is ordinarily preferred that the contact be carried out at a temperature of 0° to 100° C. for at least 1 minute The contact treatment at room temperature is especially advantageous The adsorption treatment can be accomplished according to known adsorption refining methods, for example, a method in which the powdery adsorbent is added to the shellfish extract, the mixture is stirred for a predetermined time and the adsorbent is separated by filtration, and a method in which the shellfish extract is passed through a column packed with the adsorbent to effect the adsorption treatment.

In the present invention, the refined liquid coming from the adsorption treatment step is concentrated in a substantially non-oxidizing atmosphere so that the solid concentration is at least 5% by weight. At the concentration treatment, it is preferred that water be effectively evaporated at a temperature as low as possible, and for this purpose, reduced pressure concentration or vacuum concentration is suitable. Of course, azeotropic distillation using a solvent can be adopted. Moreover, evaporation distillation using an inert gas, for example, nitrogen, as the carrier gas may be adopted A multi-staged concentrating vessel may be used for performing the concentration efficiently.

A viscous liquid or pasty product is obtained as the concentrate, or the obtained concentrate may be formed into a powdery or granular product by adoption of drying means such as freeze drying or spray drying Furthermore, by utilizing the stickiness of the concentrate, possibly together with a food binder such as a polysaccharide, the concentrate may be molded into a sheet, a flake or a cake.

The so-obtained decolorized shellfish extract concentrate of the present invention comprises amino acids, proteins and saccharides as indispensable components and has a solid content of at least 5% by weight, and the concentrate is characterized in that the integrated absorbance represented by the following formula:

$$S = \int_{400}^{800} \epsilon(x)dx$$

wherein $\epsilon(x)$ represents the absorbance at a wavelength of x nm, determined by using a cell having a thickness of 10 mm with respect to an aqueous solution having a solid concentration of 5% by weight, is not larger than 200.

The integrated absorbance S means the optical integration quantity of all the substances having absorptions over the visible wavelength region of from 400 to 800 nm, and the value S is in an inverse relation to the transparency of the liquid. Conventional shellfish extract concentrates have ordinarily an integrated absorbance S larger than 400 and even partial concentrates have ordinarily an integrated absorbance S larger than 250. In contrast, the concentrate of the present invention has an integrated absorbance not larger than 200, and even in the case where the refined liquid is concentrated so that the solid concentration is at least 40% by weight, the integrated absorbance is not larger than 150.

Figure 2:
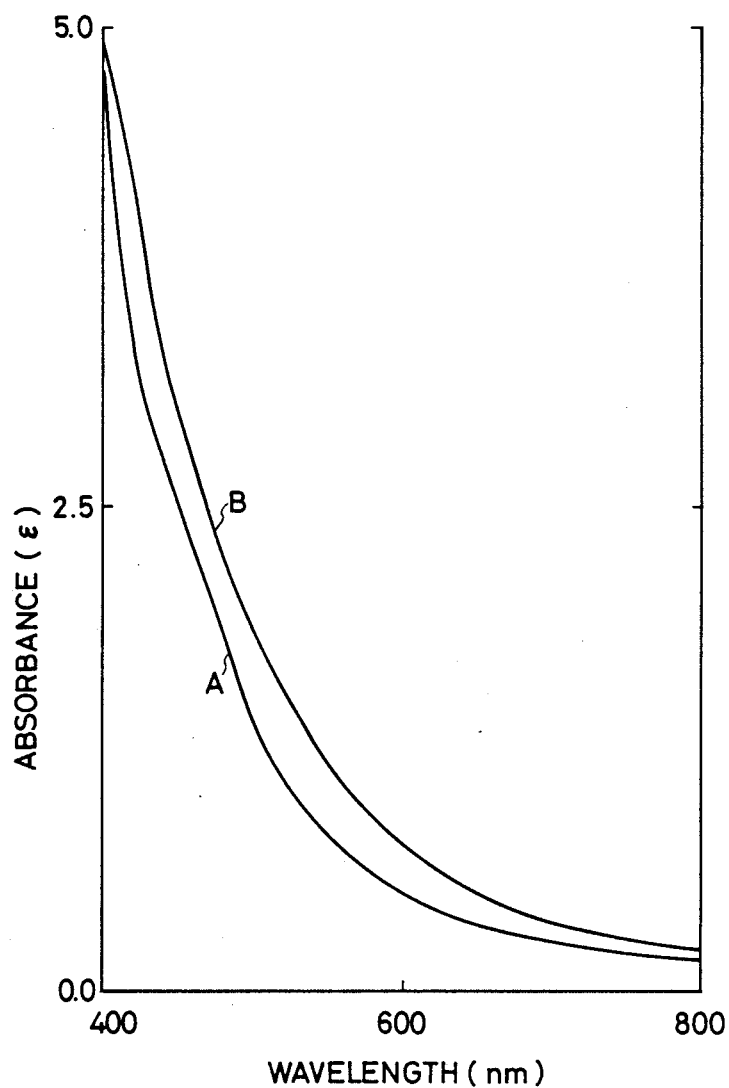
FIG. 2 shows a visible region absorption spectrum A of the starting hard-shelled mussel extract used in the examples of the present invention and a visible region absorption spectrum B of the concentrated hard-shelled mussel extract obtained in Comparative Example 1 .
Figure 3:
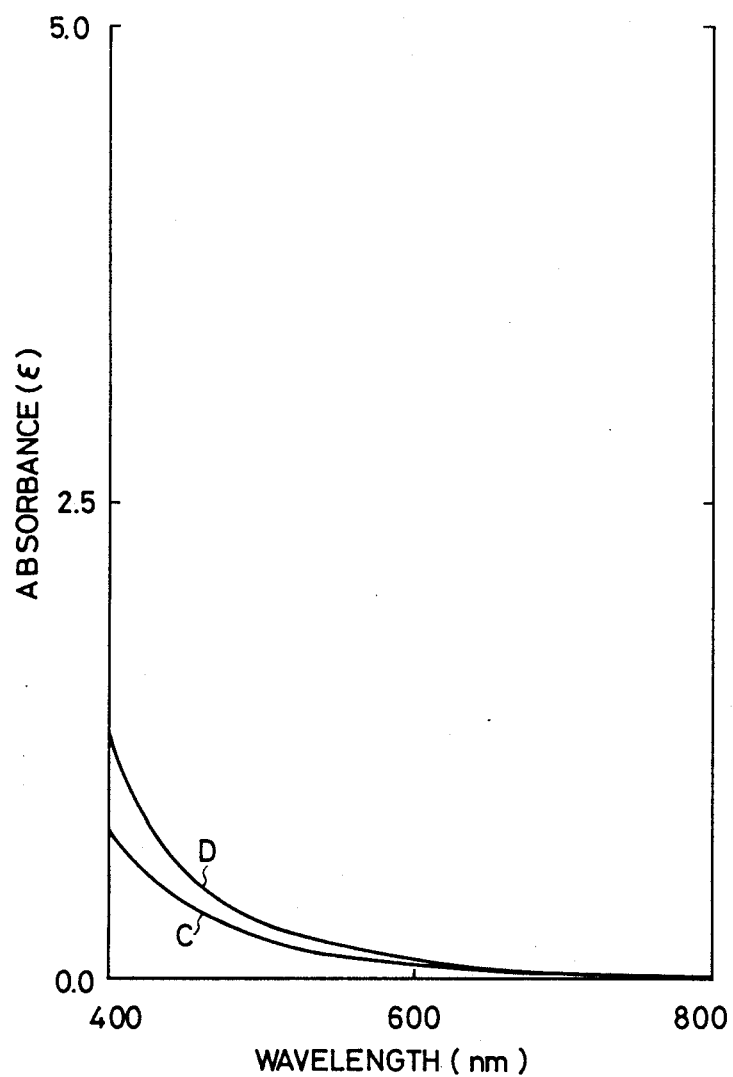
FIG.3 shows a visible region absorption spectrum C of the refined hard-shelled mussel extract obtained at the first step in Example 3 of the present invention and a visible region absorption spectrum D of the concentrated hard-shelled mussel extract obtained at the second step of Example 3.

FIG. 2 shows visible region absorption spectra of the starting hard-shelled mussel extract and the conventional concentrate, and FIG. 3 shows visible region absorption spectra of the hard-shelled mussel extract refined by the adsorption refining treatment using the specific adsorbent according to the present invention and the concentrate thereof From these spectra, it is seen that in the concentrate according to the present invention, the contents of components having absorptions on the short wavelength side are drastically reduced and increase of the contents of these components by the concentration is prominently controlled.

The concentrate of the present invention is characterized in that the coloring components are removed and simultaneously, components giving a bad taste or bad smell are removed, and that taste and seasoning components in the shellfish extract are present in the highly concentrated state.

Figure 4:
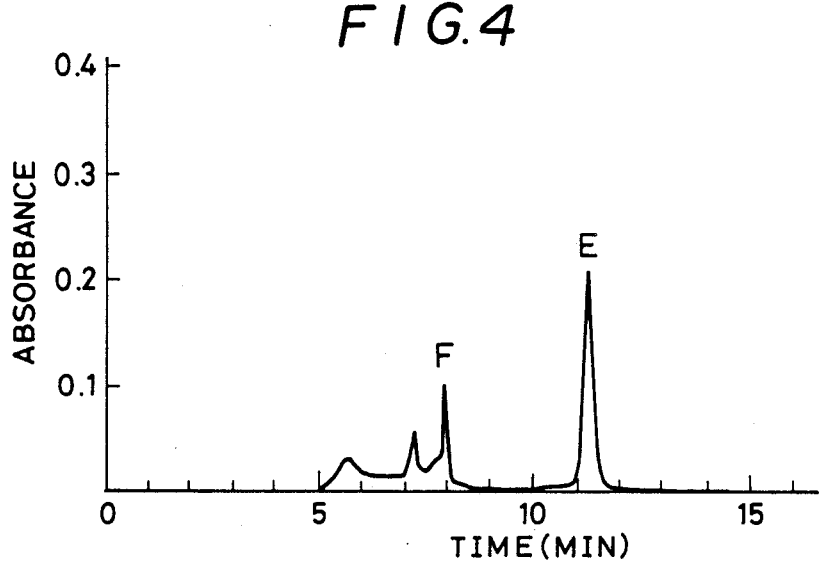
FIG. 4 is a high speed liquid chromatogram of a refined hard-shelled mussel extract obtained at the first step of Comparative Example 3, which was obtained by using water as the developing liquid.
Figure 5:
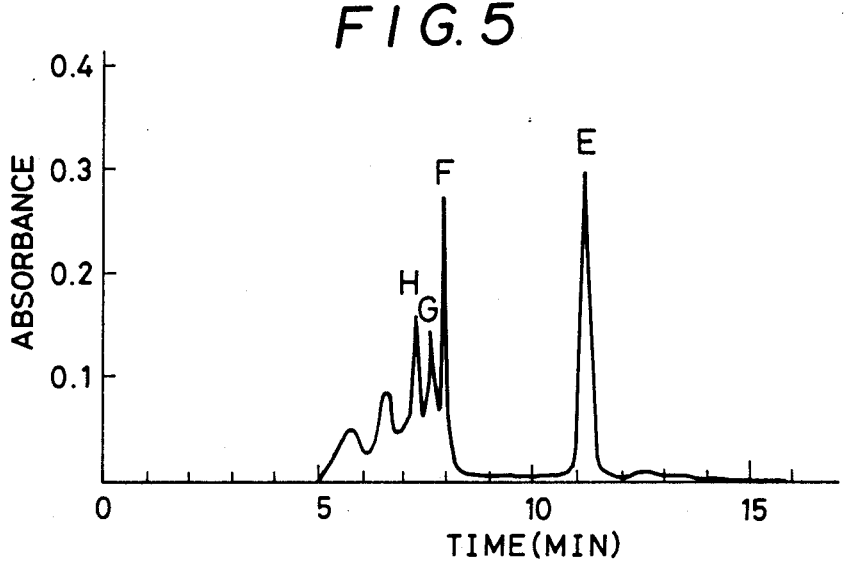
FIG. 5 is a high speed liquid chromatogram of a refined hard-shelled mussel extract obtained at the first step of Example 3, which was obtained by using water as the developing liquid.

Although the fact that the shellfish extract concentrate of the present invention has a gentle, mellow, delicious flavor and taste is proved by the organoleptic test described hereinafter, the fact that the shellfish extract of the present invention contains effective components other than the above-mentioned undesirable components at high concentration can be proved by the chromatography. FIGS. 4 and 5 are high speed liquid chromatograms obtained by adjusting the solid concentration to 5% by weight in a refined liquid (FIG. 4) formed by treating the starting hard-shelled mussel extract with active carbon alone so that the integrated absorbance is about 70 and a refined liquid (FIG. 5) formed by treating the starting hard-shelled mussel extract with lamellar magnesium phylosilicate and active carbon so that the integrated absorbance is about 70, and subjecting the refined liquids to the high speed liquid chromatography using water as the developing liquid and gel TSK G2500 PWXL supplied by Toyo Soda as the column. From these chromatograms, it is seen that in the concentrate of the present invention, the effective components in the hard-shelled mussel extract are retained at high concentrations In the chromatogram of FIG. 5, the peak E is a peak inherent to leucine and/or isoleucine, the peak F is a peak inherent to glutamic acid and/or succinic acid, and the peaks G and H are peaks inherent to other flavor components (deemed to be other amino acids and/or water-soluble low-molecular-weight protein components). It must be noted that these peaks in FIG. 5 are much higher than corresponding peaks in FIG. 4.

The present invention will now be described in detail with reference to the following examples that by no means limit the scope of the invention.

Incidentally, in the examples, the properties were determined according to the following methods.

(1) Specific Surface Area of Adsorbent

The specific surface area of the adsorbent was measured by an automatic BET (specific surface area) measuring apparatus (Sorptomatic Series 1800 supplied by Carlo Erba).

(2) Solid Concentration in Shellfish Extract

Insoluble and foreign substances in the sample shellfish extract were separated by filtration using quantitative filter paper No 5C, and the filtrate was used as the sample liquid About 1 g of the sample liquid was charged in a weighing glass bottle having a known weight (a g) and a diameter of about 4 cm, and the weight (b g) of the sample-charged bottle was precisely weighed. Then, the charged bottle was placed in a thermostat drier maintained at 105° C. and drying was conducted for 5 hours so that the weight was not changed. The bottle was naturally cooled in a deciccator and the weight (c g) was precisely measured The solid concentration (% by weight) was calculated according to the following formula:

Solid concentration (% by weight)=(c−a)/(b−a)×100

(3) Integrated Absorbance S of Shellfish Extract

Insoluble and foreign substances were separated in advance and the sample shellfish extract having a known solid concentration was diluted with distilled water to a solid concentration of 5% by weight to form a sample liquid.

The absorption spectrum of the sample liquid in a wavelength region of from 400 to 800 nm was measured under conditions described below by using an automatic recording spectrophotometer (double-beam double monochrometer UVIDEC 650 supplied by Nippon Bunko Kogyo).

Reference (reference optical path): distilled water
Spectrum width: 2.00 nm
Time constant 0.4 second
Scanning wavelength region: 800–400 nm
Wavelength scale 40 nm/cm
Measurement scale 0.000–5,000 absorbance
Used oil: 10 mm quartz cell The integrated absorbance is represented by the following formula:

$$S = \int_{400}^{800} \epsilon(x)dx$$

wherein $\epsilon(x)$ represents the adsorbance at x nm, determined by using a cell having a thickness of 10 mm with respect to a solution having a solid concentration of 5% by weight.

The integrated absorbance S was determined by measuring the integrated region area in the absorption spectrum diagram.

(4) Chromatogram by High Speed Liquid Chromatograph

Insoluble and foreign substances were separated in advance, and the sample shellfish extract having a known solid concentration was diluted with distilled water to a solid concentration of 5% by weight to form a sample liquid.

The chromatogram of the sample liquid was determined under the following conditions by using a high speed liquid chromatography apparatus (supplied by Nippon Waters Limited).

Column: TSK G2500 PWXL (hydrophilic polymer supplied by Toyo Soda)
Developing liquid water
Flow rate: 0.8 ml/min
Feed amount: 10 μl
Pressure 300–350 PSI
Temperature: 20° C.
Detective device: UV (254 nm, 1.0 AUFS)
Full scale of recorder 10 mV (5) Organoleptic Test of Flavor of Shellfish Extract A shellfish extract concentrate and a dilution thereof having a solid concentration of 5% by weight were used as liquid samples, and the flavor and taste of each sample were evaluated by 10 cooking experts according to the 10-points method and expressed by an average value.

Referential Examples 1 and 2

A powder of activated silicic acid (Silton® supplied by Mizusawa Industrial Chemicals, Ltd.) and a powder of magnesium dioxide were mixed at an $SiO_2/MgO$ molar ratio of 3/4, and the mixture was pulverized and mixed for 10 hours in a dry method or a wet method by using a pot mill The dry-treated product was directly used as the inorganic magnesium compound adsorbent (Referential Example 1). The wet-treated product was dried and pulverized and was then used as the inorganic magnesium compound adsorbent (Referential Example 2).

EXAMPLE 1

A stainless steel vessel was charged with 1200 g of a hard-shelled mussel broth (having a solid concentration of 6.2% by weight), and 60 g of lamellar magnesium phylosilicate (Mizukalife® supplied by Mizusawa Industrial Chemicals, Ltd.) having a specific surface area of 639 $m^2/g$ was added. The mixture was stirred at 30° C. for 30 minutes and filtered by quantitative filter paper No. 5C to obtain a light-yellow transparent hard-shelled mussel extract (first step).

An eggplant type flask having a capacity of 2 liters was charged with 1000 g of the hard-shelled mussel extract obtained at the first step and the extract was concentrated at a temperature of 90° C. under a reduced pressure by using a rotary evaporator (Model RE46A supplied by Yamato Kagaku) to obtain 140 g of a viscous hard-shelled mussel extract concentrate having an amber color (second step).

When the solid concentration was measured, it was found that the solid concentration was 43% by weight. The integrated absorbance S of a dilution of the concentrate to 5% by weight with distilled water, the result of comparison of the chromatogram with the chromatogram shown in FIG. 5 and the flavor test result are shown in Table 2 . It is seen that the obtained hard-shelled mussel extract has a very high commercial value.

EXAMPLE 2

Lamellar magnesium phylosilicate was mixed with active carbon at a weight ratio of 3/1 and composite reaction was carried out in the presence of water, and post treatments such as filtration, drying and pulverization were conducted to obtain a composite adsorbent powder having a specific surface area of 540 $m^2/g$.

A stainless steel vessel was charged with 1200 g of a hard-shelled mussel or short-necked clam broth (having a solid concentration of 6.2% by weight), and 25 g of the obtained composite adsorbent powder was added. The mixture was stirred at 30° C. for 30 minutes and filtered by quantitative filter paper No. 5C to obtain a light-yellow transparent hard-shelled mussel or short-necked clam extract (first step).

An eggplant type flask having a capacity of 2 liters was charged with 1000 g of the hard-shelled mussel or short-necked clam extract obtained at the first step and the extract was concentrated at 90° C. under a reduced pressure by a rotary evaporator to obtain 133 g of a viscous hard-shelled mussel or short-necked clam extract concentrate having an amber color (second step).

When the solid concentration of the obtained concentrate was measured, it was found that the concentration was 45% by weight The integrated absorbance S and the flavor test result are shown in Table 2 . It is seen that the each of the hard-shelled mussel and short-necked clam extract concentrates (Example 2-1 and Example 2-2) has a very high commercial value.

EXAMPLE 3

A stainless steel vessel was charged with 1200 g of a hard-shelled mussel broth (having a solid content of 6.2% by weight), and 18 g of lamellar magnesium phylosilicate (Mizukalife® supplied by Mizusawa Industrial Chemicals, Ltd.) having a specific surface area of 639 $m^2/g$ and 6 g of active carbon (Strong Shirasagi supplied by Takeda Yakuhin) were added. The mixture was stirred at 30° C. for 30 minutes and filtered by quantitative filter paper No. 5C to obtain a transparent light-yellow hard-shelled mussel extract (first step).

An eggplant type flask having a capacity of 2 liters was charged with 1000 g of the hard-shelled mussel extract obtained at the first step and the extract was concentrated at 90° C. under a reduced pressure to obtain 154 g of a viscous hard-shelled mussel extract concentrate having an amber color (second step).

When the solid concentration of the obtained concentrate was measured, it was found that the concentration was 39% by weight. The integrated absorbance S of the concentrate, the result of comparison of the chromatogram with the chromatogram shown in FIG. 5 and the flavor test result are shown in Table 2. It is seen that the hard-shelled mussel extract concentrate has a very high commercial value.

EXAMPLE 4

A stainless steel vessel was charged with 1200 g of a hard-shelled mussel broth (having a solid content of 6.2% by weight), and 70 g of the magnesium oxide/silicon dioxide adsorbent obtained in Referential Example 1 and 7.2 g of active carbon (Carbolafin supplied by Takeda Yakuhin) were added The mixture was stirred at 30° C. for 30 minutes and filtered by quantitative filter paper No. 5C to obtain a light-yellow transparent hard-shelled mussel extract (first step).

An eggplant type flask having a capacity of 2 liters was charged with 1000 g of the hard-shelled mussel extract obtained at the first step and the extract was concentrated at 90° C. under a reduced pressure by using a rotary evaporator to obtain 143 g of a viscous hard-shelled mussel extract concentrate having an amber color (second step).

When the solid concentration of the concentrate was measured, it was found that the solid concentration was 42% by weight. The integrated absorbance S of the concentrate, the result of comparison of the chromatogram with the chromatogram shown in FIG. 5 and the flavor test result are shown in Table 2. It is seen that the obtained hard-shelled mussel extract concentrate has a very high commercial value.

EXAMPLE 5

The hard-shelled mussel extract concentrate (100 g) obtained at the second step of Example 3 was placed on a glass saucer having a diameter of 30 cm and the saucer was set in a thermostat drier maintained at 105° C., and the sample was dried for 8 hours to obtain a solid hard-shelled mussel extract The solid product was pulverized by a desk sample mill to obtain a hard-shelled mussel extract powder having an amber color and no burnt smell.

The integrated absorbance S calculated from the absorption spectrum of a 5% by weight solution of the hard-shelled mussel extract powder in distilled water, the result of comparison of the chromatogram with the chromatogram shown in FIG. 5 and the flavor test result are shown in Table 2. It is seen that the hard-shelled mussel extract powder has a very high commercial value.

EXAMPLE 6

An eggplant type flask having a capacity of 2 liters was charged with 1200 g of a hard-shelled mussel broth (having a solid content of 6.2% by wignt), and 18 g of lamellar magnesium phylosilicate (Mizukalif® supplied by Mizusawa Industrial Chemicals, Ltd.) having a specific surface area of 639 $m^2/g$ and 6 g of active carbon (Strong Shirasagi supplied by Takeda Yakuhin) were added. The mixture was concentrated at 90.C under a reduced pressure by using a rotary evaporator to obtain 211 g of a viscous hard-shelled mussel extract concentrate containing the adsorbent (first step).

The adsorbent was separated and removed from the concentrate obtained at the first step by a small-size centrifugal separator (5,000 G) to obtain 165 g of a viscous hard-shelled mussel extract having an amber color (second step).

When the solid concentration of the obtained concentrate was measured, it was found that the solid concentration was 56% by weight. The integrated absorbance S of the concentrate, the result of comparison of the chromatogram with the chromatogram shown in FIG. 5 and the flavor test result are shown in Table 2. It is seen that the hard-shelled extract concentrate has not a burnt smell observed in conventional concentrates and has a very high commercial value.

COMPARATIVE EXAMPLE 1

A hard-shelled mussel broth (having a solid concentration of 6.2% by weight) was filtered by quantitative filter paper No. 5C without addition of an adsorbent to obtain a starting hard-shelled mussel extract from which insoluble and foreign substances had been removed (first step).

An eggplant type flask having a capacity of 2 liters was charged with 1000 g of the hard-shelled mussel extract obtained at the first step and the hard-shelled mussel extract was concentrated at 90° C. under a reduced pressure by using a rotary evaporator to obtain 144 g of a hard-shelled mussel extract concentrate having a blackish brown color (second step).

When the solid concentration of the obtained concentrate was measured, it was found that the solid concentration of the concentrate was 43% by weight. The integrated absorbance S of the concentrate, the result of comparison of the chromatogram with the chromatogram shown in FIG. 5 and the flavor test result are shown in Table 2. The concentrate was densely black, had bad smell and taste and was poor in the flavor.

When the concentrate obtained at the second step was dried in the same manner as described in Example 5, the concentrate got scorched.

COMPARATIVE EXAMPLE 2

A stainless steel vessel was charged with 1200 g of a hard-shelled mussel broth (having a solid concentration of 6.2% by weight) and 6 g of active carbon (Strong Shirasagi supplied by Takeda Yakuhin) was added. The mixture was stirred at 30° C. for 30 minutes and filtered by quantitative filter paper No. 5C. The active carbon not separated by the filtration was separated by a centrifugal separator (5,000 G) to obtain a slightly blackish, light-yellow transparent hard-shelled mussel extract (first step).

An eggplant type flask having a capacity of 2 liters was charged with 1000 g of the hard-shelled mussel extract obtained at the first step, and the hard-shelled mussel extract was concentrated at 90° C. under a reduced pressure by a rotary evaporator to obtain 150 g of a viscous hard-shelled mussel extract concentrate having a blackish brown color (second step).

When the solid concentration of the obtained concentrate was measured, it was found that the solid concentration of the concentrate was 40% by weight. The integrated absorbance S of the concentrate, the result of comparison of the chromatogram with the chromatogram shown in FIG. 5 and the flavor test result are shown in Table 2. The concentrate was densely colored and relatively poor in the flavor, and the commercial value was low.

COMPARATIVE EXAMPLES 3

A stainless steel vessel was charged with 1200 g of a hard-shelled mussel broth (having a solid concentration of 6.2% by weight) and 15 g of active carbon (Strong Shirasagi supplied by Takeda Yakuhin) was added. The mixture was stirred at 30° C. for 30 minutes and filtered by quantitative filter paper No. 5C, and the active carbon which was not separated by the filtration was separated by a centrifugal separator (5,000 G) to obtain a transparent hard-shelled mussel extract having a slight yellow color (first step).

An eggplant type flask having a capacity of 2 liters was charged with 1000 g of the hard-shelled mussel extract obtained at the first step, and the extract was concentrated at 90° C. under a reduced pressure by using a rotary evaporator to obtain 158 g of a viscous hard-shelled mussel extract concentrate having an amber color (second step).

When the solid concentration of the obtained concentrate was measured, it was found that the solid concentration of the concentrate was 38% by weight. The integrated absorbance S of the concentrate, the result of comparison of the chromatogram with the chromatogram shown in FIG. 5 and the flavor test result are shown in Table 2. The concentrate was poor in the flavor and taste though the coloration degree was low.

COMPARATIVE EXAMPLE 4

An eggplant type flask having a capacity of 2 liters was charged with 1200 g of a hard-shelled mussel broth (having a solid concentration of 6.2% by weight), and the broth was concentrated at 90° C. under a reduced pressure by a rotary evaporator to obtain 230 g of a hard-shelled mussel extract concentrate having a blackish brown color and a solid concentration of 35% by weight (first step).

A stainless steel vessel was charged with 200 g of the hard-shelled mussel extract concentrate obtained at the first step, and 19 g of lamellar magnesium phylosilicate having a specific surface area of 639 m²/g (Mizukalife® supplied by Mizusawa Industrial Chemicals, Ltd.) and 19 g of active carbon (Strong Shirasagi supplied by Takeda Yakuhin) were added to the concentrate. The mixture was stirred at 20° C. for 30 minutes and the adsorbent was separated and removed by a small-size centrifugal separator (5,000 G) to obtain a blackish brown hard-shelled mussel extract concentrate (second step).

When the solid concentration of the concentrate was measured, it was found that the solid concentration of the concentrate was 31% by weight. The integrated absorbance S of the concentrate, the result of comparison of the chromatogram with the chromatogram shown in FIG. 5 and the flavor test result are shown in Table 2. Blackish coloration was extreme, and the concentrate had bad smell and taste and was poor in the flavor.

The results obtained in the foregoing examples and comparative examples are shown in Table 2.

TABLE 2

| | Integrated absorbance S | Comparison with chromatogram of FIG. 5 | Flavor test results (1) | (2) |
|---|---|---|---|---|
| Example 1 | 108 | substantially same | 9.6 | 9.7 |
| Example 2-1 | 78 | substantially same | 9.7 | 9.4 |
| Example 2-2 | 90 | substantially same | 9.2 | 9.2 |
| Example 3 | 59 | substantially same | 9.7 | 9.8 |
| Example 4 | 145 | substantially same | 9.8 | 9.8 |
| Example 5 | 83 | substantially same | 9.5 | 9.3 |
| Example 6 | 77 | substantially same | 9.2 | 9.0 |
| Comparative Example 1 | 468 | substantially same | 5.9 | 4.1 |
| Comparative Example 2 | 231 | substantially same | 6.8 | 7.2 |
| Comparative Example 3 | 67 | peaks G and H substantially disappeared | 5.3 | 7.3 |
| Comparative Example 4 | 438 | substantially same | 6.5 | 5.2 |

Note
Flavor test (1): hard-shelled mussel extract diluted to a solid concentration of 5% by weight
Flavor test (2): hard-shelled mussel extract concentrate

We claim:

1. A process for the preparation of a shellfish extract concentrate, which comprises subjecting an extract of a shellfish selected from the group consisting of Liolophura japonica, Aplyxis kurodai, Lymnaeidae, Thecosomate, Anadara, Mytilidae and Myaarendria, having a solid concentration not higher than 30% by weight to an adsorption purification treatment at a temperature of 0° to 100° C. for at least 1 minute with an absorbent comprising a water-insoluble synthetic magnesium silicate, which has a specific surface area of at least 100 m²/g, in an amount of 0.5 to 20% by weight based on the shellfish extract, and concentrating the refined liquid in a substantially non-oxidizing atmosphere so that the solid concentration is at least 5% by weight.

2. A process according to claim 1, wherein the magnesium silicate has a composition represented by the following formula:

MgO·mSiO₂·nH₂O wherein m is a number of from 0.5 to 2 and n is a number not larger than 2.

3. A process according to claim 1, wherein the magnesium silicate is a synthetic lamellar magnesium phyllosilicate having composition represented by the following formula:

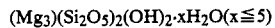

(Mg₃)(Si₂O₅)₂(OH)₂·xH₂O(x≦5)

and has X-ray diffraction peaks at spacings of 4.5 to 4.6 Å and 1.5 to 1.6 Å and a specific surface area of at least 300 m²/g.

4. A process according to claim 1, wherein the adsorbent comprises the magnesium silicate in an amount of 0.5 to 20% by weight based on the shellfish extract and active carbon in an amount of 0.5 to 5% by weight based on the shellfish extract.

5. A process according to claim 4, wherein the magnesium silicate and active carbon are simultaneously added.

6. A process according to claim 4, wherein the magnesium silicate and active carbon are added sequentially.

7. A process according to claim 1, wherein the shellfish is a mytilidae selected from the group consisting of blue mussel, hard-shelled mussel or scallop.

8. The extract produced by the process of claim 1.

9. The extract as set forth in claim 8, which comprises, as indispensable components, amino acids, proteins, saccharides and minerals and having a solid content of at least 5% by weight, wherein the integrated absorbance S represented by the following formula is not larger than 200, $$S = \int_{400}^{800} \epsilon(x)dx$$

wherein 68 (x) represents the absorbance at a wavelength of x nm, determined by using a cell having a thickness of 10 mm with respect to an aqueous solution having a solid concentration of 5% by weight.

10. The process according to claim 1, wherein said extract of a shellfish has a solid concentration of 2 to 30% by weight.

11. The process according to claim 1, wherein said extract of a shellfish has a solid concentration of 3 to 15% by weight.

12. The process according to claim 1, wherein said water-insoluble synthetic lamellar magnesium phyllosilicate is present in an amount of 1 to 15% by weight based on said shellfish extract.

13. The process according to claim 4, wherein the weight ratio of said magnesium phyllosilicate to said active carbon is from 2/1 to 10/1.

14. The extract as set forth in claim 9, wherein said solid concentration is at least 40% by weight and said integrated absorbance is not larger than 150.

* * * * *